United States Patent [19]

Eckerbom

[11] 4,011,370

[45] Mar. 8, 1977

[54] METHODS AND APPARATUS FOR CLOSING THE BOTTOM ENDS OF ELECTRODE TUBES

[75] Inventor: Gunnar Eckerbom, Kungalv, Sweden

[73] Assignee: Aktiebolaget Tudor, Sundbyberg, Sweden

[22] Filed: June 2, 1976

[21] Appl. No.: 692,119

[30] Foreign Application Priority Data

Feb. 6, 1975 Sweden .............................. 7506254

[52] U.S. Cl. .............................. 429/140; 429/238
[51] Int. Cl.² ...................................... H01M 35/12
[58] Field of Search .......... 429/131, 140, 238, 164, 429/136

[56] References Cited

UNITED STATES PATENTS 2,015,636  9/1935  Hamilton ........................ 429/140 x
2,026,193  12/1935  Smith ............................... 429/140

*Primary Examiner*—Anthony Skapars
*Attorney, Agent, or Firm*—Burns, Doane, Swecker & Mathis

[57] ABSTRACT

A battery electrode includes a plurality of sheaths. The base portion of a bottom strip is secured to bottom, open ends of the sheaths. The bottom strip also includes movable closure sections which can be swung open to allow filling of the sheaths with active material, and which can be swung closed to close the bottom ends of the sheaths.

7 Claims, 4 Drawing Figures

METHODS AND APPARATUS FOR CLOSING THE BOTTOM ENDS OF ELECTRODE TUBES

BACKGROUND AND OBJECTS

The present invention concerns bottom strips for tubular electrodes, for electric storage batteries. The invention likewise relates to electrodes provided with such bottom strips, and a process for manufacture of bottom strips and electrodes.

Tubular electrodes are used for various kinds of electric storage batteries, such as lead storage batteries and various alkaline batteries, for example. Each electrode comprises a plurality of rods with an outer tubular sheath of inert material that is permeable to the electrolyte. Within the sheath there is disposed electrochemically active electrode material, as well as one or more electric conductors, so-called cross bars. The cross bars are, as a rule, joined at the upper edge of the electrode with an electrically conductive strip, the so-called top frame. At the bottom, the tubular sheath is closed by a so-called bottom strip.

Manufacture of lead storage batteries proceeds in such a way that the cross pieces and the top frame are cast in one piece. The tubular sheath is then drawn over the cross bars, whereafter the electrode shell thereby produced is placed with the top frame downward and the tubular sheath is filled with active material. The sheath is closed thereafter with a bottom strip, generally made of a suitable plastic material.

The bottom strip can be fastened to the tubular sheaths, e.g., by being furnished with spurs that project into the tubes and are firmly pressed into them. The spurs may have recesses for the cross bars and thereby serve to center them. The bottom strip may also be glued or welded on. The bottom strip may be of solid or porous material.

The tubular sheaths can be made either as single tubes or cohesive so-called multiple tubes. In both cases, the fitting of the bottom strip may entail problems. There may be difficulty, particularly in the manufacture of lead storage battery electrodes, because the cross bars are made of relatively soft material. If the cross bars are intended to fit into a recess in the bottom strip spurs, but have become poorly centered in the course of filling, they can be bent by the bottom strip, as the latter is installed and forced out toward the side of the tube. In order to avoid this, it is necessary to check on the centering of the cross bars before the bottom strip is set on.

The above mentioned problems are solved by the present invention, and additional advantages are also attained in connection with the handling of the tubular sheaths and the charging of them with active material.

BRIEF SUMMARY

A bottom strip according to the invention comprises at least two parts. A first part or base is fixed in the tube ends and joins the individual tubes. One or more second parts are movably joined with the base. They are of such configuration that they can cover the base like a lock.

In a preferred embodiment, the base is common to all the tubular sheaths of an electrode, with the two movable sections disposed on each other alongside the base. The movable sections are joined with the first part and are of such configuration that together they can cover the openings in the base. Advantageously the movable sections are identical. The extent of the movable parts in a plane perpendicular to the plane of the electrode should equal or somewhat exceed half the extent of the first part fixed in the tube ends, in the same plane.

THE DRAWINGS

The preferred embodiments of the invention are also shown in the figures as follows.

DETAILED DESCRIPTION

Figure 1:
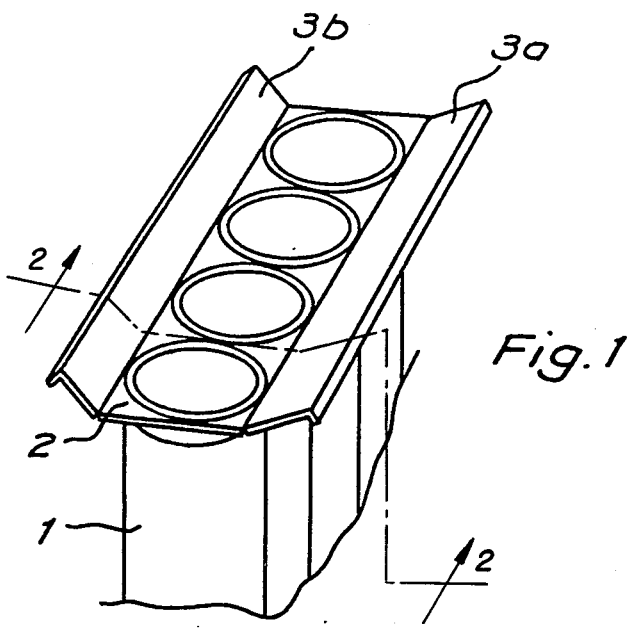
FIG. 1 shows the lower part of a tubular electrode with four tubes, with a bottom strip according to the invention being in an open position.

In FIG. 1 the bottom portions of the tubular sheaths 1 are depicted in an inverted position for being filled with electrolyte. On the sheaths 1 is mounted the bottom strip which comprises a first part or base 2 and a pair of movable closure sections 3a, 3b. The base 2 is fixed to the ends of the sheaths by conventional coupling techniques.

For instance, the bottom strips according to the invention can be made as pieces separate from the sheaths and fixed on the tubular sheaths in some previously known way, yet with the difference that the fixation occurs before the sheaths are filled with active material.

The base can be provided with holes through which the sheaths extend (FIG. 1). Suitable bonding agent or mechanical fasteners can be employed to connect the base to the sheaths. The fastening of the bottom strips may be effected before or after the tubular sheaths are pulled over the electrode grid.

Figure 2:
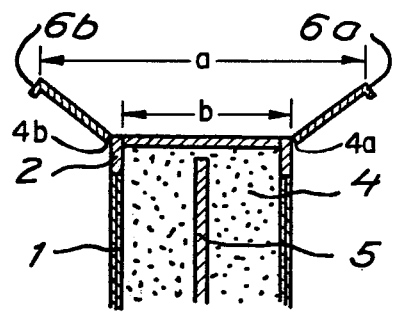
FIG. 2 shows a cross section through a tube of the same electrode along line 2—2 of FIG. 1, with bottom strip being in the open position.

A second preferred method is to form them directly on the tubular sheaths (FIG. 2). This can suitably be done by placing the desired number of sheaths in a transfer mold whereafter the bottom strip is cast, of thermoplastic material. In this way, there is a fixed joint between the bottom strip and the tubular sheaths. Also when individual tubes are used, all tubes that belong to one electrode would be joined with such an arrangement. This is an advantage in subsequent handling of the electrode.

Figure 3:
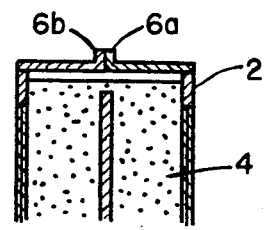
FIG. 3 shows a cross section diametrically through a tube with the bottom strip being in a closed position.

In the tubular sheath there is active material 4 and electrically conductive cross bars 5. The base 2 and the movable closure sections 3a, 3b are preferably integral and include scored edges 4a, 4b which define a hinge axis for the movable sections. In length, movable sections are preferably each one-half or slightly larger than one-half the width of b of the base so that when they are swung about the hinge axes 4a, 4b, they will abut at their free ends 6a, 6b to close the sheaths (FIG. 3). The sections will thus be connected to the base, and fit tightly against one another at 6a, 6b to close all of the sheaths.

Figure 4:
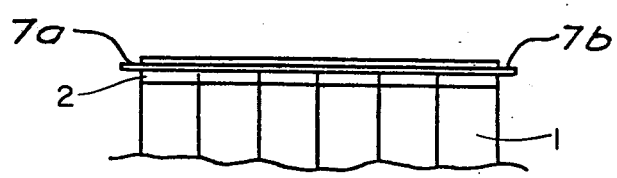
FIG. 4 is a side view of a modified form of the invention.

FIG. 4 is a side view of an electrode with six tubes. This electrode has a variant of the bottom strip according to the invention, which is of such configuration that the bottom strip includes projecting lips 7a and 7b along its short sides. These lips are intended primarily for suspension or other automated handling of the electrode and the electrode sheath. They are superfluous on the finished electrode and may suitably be cut away. The lips may constitute part of either the base 2 or movable sections 3 of the bottom strip, or they may be part of both.

The active material that is to be charged into the tubular sheaths is generally pulverous. It is poured into the sheaths, whereafter the electrodes are vibrated to compact the active material. As a general rule, the electrodes are fixed one by one in fixtures for this purpose. For various reasons, it is desirable to have as little of the active material as possible spilled outside of the electrode. The charging devices and fixtures are therefore usually designed with this in mind. The present invention is very advantageous in this regard. That is, the bottom strip can be set on the tubular sheaths before the latter are charged with active material, and the sections 3a, 3b of the bottom strip can be placed in a position where they point out obliquely upward from the electrodes (FIG. 2). Thus, it is possible to practically double the area to which the active material can be delivered. That is, dimension a is practically double that of dimension b (FIG. 2). In this way, the closing strip can serve as a funnel to substantially increase the rate-of-feed capacity of the charging device.

Also, compared with previously used methods involving fixing of the bottom strip after charging of the active material in the sheath, the bottom strip of the invention provides a construction that readily allows automation of the closing of the tubular electrodes. This is an essential advantage, in aspects of both industrial hygiene and economy.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A closure strip for covering the bottom ends of battery electrode tubes, said bottom strip comprising:
    a base mounted on the bottom ends of the electrode tubes joining said electrode tubes together, and
    at least one movable closure section joined to said base, said movable closure section being movable from an open position allowing the tubes to be filled with active material to a closed position closing the bottom ends of said electrode tubes.

2. A closure strip according to claim 1 wherein said at least one movable section being swingable about a hinge axis extending parallel to the plane of said electrode tubes, said movable section being swingable to a closed position to extend completely across the bottom ends of the electrode tubes.

3. A closure strip according to claim 2 wherein said at least one movable section comprises a pair of movable sections, each of which being about one half the width of said base.

4. A closure strip according to claim 3 wherein said movable sections are of identical configuration.

5. A battery electrode comprising:
    a plurality of sheaths each containing active material and a cross bar;
    a bottom strip mounted on the bottom ends of said sheaths, said bottom strip comprising:
        a base having openings communicating with the interiors of said sheaths, and
        at least one movable section joined to said base and being swingable from an open position to a closed position across said base to close the bottom ends of all of said sheaths.

6. A method for making a battery electrode comprising the steps of:
    mounting the base portion of a bottom strip to the bottom ends of a plurality of sheaths so that said sheaths are maintained in a row, with open ends of said sheaths exposing cross bars mounted in said sheaths;
    orienting said sheaths so that said open sheaths face upwardly;
    disposing a movable section joined to said base in an open position so as to uncover the open ends of said sheaths;
    pouring active material into said sheaths; and
    closing said movable section to close the bottom ends of said sheaths after said pouring step is completed.

7. A method according to claim 6 wherein said disposing step comprises disposing a pair of movable sections joined to said base to open positions so as to extend upwardly and outwardly from opposite sides of said row of sheaths, the distance between the outer edges of said movable sections being greater than the distance between the inner edges thereof, so that during said pouring step, said movable sections tend to funnel active material into said sheaths.

* * * * *